(12) United States Patent
Laukemann et al.

(10) Patent No.: US 8,925,694 B2
(45) Date of Patent: Jan. 6, 2015

(54) COOLING SYSTEM WITH A DRIVE MOTOR AND A HYDRODYNAMIC MACHINE

(75) Inventors: Dieter Laukemann, Vellberg (DE); Thomas Ohr, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 965 days.

(21) Appl. No.: 12/312,555

(22) PCT Filed: Jul. 25, 2007

(86) PCT No.: PCT/EP2007/006601
§ 371 (c)(1),
(2), (4) Date: Jan. 4, 2010

(87) PCT Pub. No.: WO2008/058578
PCT Pub. Date: May 22, 2008

(65) Prior Publication Data
US 2010/0147641 A1    Jun. 17, 2010

(30) Foreign Application Priority Data
Nov. 17, 2006    (DE) .......................... 10 2006 054 615

(51) Int. Cl.
*F16F 9/42*        (2006.01)
*B60T 10/02*       (2006.01)
(52) U.S. Cl.
CPC ........................................ B60T 10/02 (2013.01)
USPC .......... 188/274; 188/264 D; 188/290; 188/296
(58) Field of Classification Search
USPC ............................... 188/296, 274, 290, 264 D
See application file for complete search history.

(56) References Cited

U.S. PATENT DOCUMENTS

| 2005/0016804 A1* | 1/2005 | Vogelsang et al. ............. 188/296 |
| 2005/0269177 A1* | 12/2005 | Vogelsang ..................... 188/296 |
| 2007/0102251 A1* | 5/2007 | Laukemann ................... 188/296 |

FOREIGN PATENT DOCUMENTS

| DE | 1 213 269 | 3/1966 |
| DE | 40 33 745 A1 | 4/1992 |
| DE | 102 42 735 A1 | 3/2004 |
| DE | 103 42 869 B4 | 7/2005 |
| GB | 19248 | 7/1907 |
| JP | 08170662 A | 7/1996 |

* cited by examiner

*Primary Examiner* — Anna Momper
*Assistant Examiner* — San Aung
(74) *Attorney, Agent, or Firm* — Ohlandt, Greeley, Ruggiero & Perle, LLP (57) ABSTRACT

A cooling system has a drive motor which is to be cooled by a cooling medium. A cooling medium circuit conducts the cooling medium. A hydrodynamic machine comprising a working space can be filled with a working medium. The working medium is the cooling medium, and the hydrodynamic machine has a seal which is cooled and/or lubricated by the cooling medium. A cooling medium pump for circulating the cooling medium is in the cooling medium circuit. A pick-off is in the cooling medium circuit in the region of the cooling medium pump. Via the pick-off, the cooling medium is branched out of the cooling medium circuit. The branched-off cooling medium is conducted directly through or past the seal to cool and/or lubricate the latter, and the cooling medium which is conducted through or past the seal is supplied to the cooling medium circuit upstream or downstream of the working space.

6 Claims, 7 Drawing Sheets

COOLING SYSTEM WITH A DRIVE MOTOR AND A HYDRODYNAMIC MACHINE

The present invention relates to a cooling system, especially a motor-vehicle cooling system, which guides a cooling medium in a cooling medium circuit in order to cool a drive motor. A hydrodynamic machine with a working space which is or can be filled with a working medium is further arranged in the cooling medium circuit, the working medium of which is simultaneously the cooling medium.

Cooling systems with a hydrodynamic machine such as a hydrodynamic retarder whose working medium is simultaneously the cooling medium are known. As a result of the guidance of the working medium in the hydrodynamic machine or the retarder, seals are necessary, of which one or several can be cooled with the cooling medium in order to avoid impermissibly high temperatures in the seal. For this purpose, the cooling medium is introduced in the seal or moved past the seal in a heat-transferring contact, so that the cooling medium will absorb heat from the seal and discharge the same via the cooling medium circuit in which a cooler, e.g. the vehicle cooler, is arranged.

The cooling medium can also be used additionally or alternatively for lubricating the seal, especially in cases where the seal is used for sealing an input shaft or an output shaft of the hydrodynamic machine against a stationary component, e.g. the housing of the hydrodynamic machine, or a component which revolves at a deviating speed.

According to the state of the art known internally to the applicant, a certain portion of cooling medium is branched off from the cooling medium circuit directly before the hydrodynamic machine, guided into or to the seal to be cooled and/or lubricated, and thereafter recirculated to the cooling medium circuit directly behind the hydrodynamic machine.

It has been seen in practice that despite the "active" cooling or lubrication by means of the cooling medium share which is branched off separately from the cooling medium circuit the seal does not have the expected life in all applications, but that unexpected early wear and tear of the seal has frequently occurred. The reasons for this were not known at first.

Document DE 103 42 869 A1 describes a motor vehicle drive with a water retarder with the features which are summarized in the preamble of claims 1 and 2. Document DE 102 42 735 A1 describes a hydrodynamic retarder with at least three sealing elements, with one seal being flushed continually with coolant.

The invention is based on the object of providing a cooling system with a drive motor cooled by means of a cooling medium and a hydrodynamic machine arranged in the cooling medium circuit whose working medium is the cooling medium, with at least one seal in the hydrodynamic machine being cooled and/or lubricated by means of a cooling medium flow branched off by the drive motor and, in the activated state, the hydrodynamic machine, in which the life of the seal is increased as compared with the state of the art.

The object in accordance with the invention is achieved by a cooling system with the features of claim 1 or claim 2. The dependent claims describe advantageous and especially appropriate embodiments of the invention.

The inventors have recognized that operating states can occur in which an only very low volume flow of cooling medium is guided to the seal in cooling systems according to the state of the art whose features are described in the preamble of claim 1 and claim 2 and in which the cooling medium flow branches off for cooling/lubricating the seal is taken directly before the hydrodynamic machine and is supplied again directly after the hydrodynamic machine. This can lead to the consequence that the seal is cooled or lubricated only insufficiently and will thus wear off and fail too early. The cause for this low volume flow is a low pressure difference in the cooling medium circuit over the hydrodynamic machine, which means from the inlet of the hydrodynamic machine to the outlet of the hydrodynamic machine. This is especially relevant in the case of hydrodynamic machines which are optimized concerning their flow resistance, because this optimization is to ensure that the flow resistance through the hydrodynamic machine and thus the pressure drop over the hydrodynamic machine is as low as possible.

In the case that the hydrodynamic machine is a hydrodynamic retarder, the situation is made more difficult in such a way that the retarder produces an additional pumping effect in braking operation, so that a higher pressure is obtained behind the retarder than before the retarder. In this situation, the direction of the cooling medium volume flow supplied to the seal will be reversed.

A first solution in accordance with the invention therefore provides that the cooling medium is branched off from the cooling medium circuit behind or in the region of the cooling medium pump which is arranged in the cooling medium circuit and with which the cooling medium is revolved in the cooling medium circuit, and is supplied directly to the seal, with pressure losses advantageously being avoided by optimized routing of the lines. Once the tapped cooling medium flow has been guided through the seal or past the seal, it can be supplied to the remaining cooling medium circuit again before the hydrodynamic machine or behind the hydrodynamic machine.

The maximum pressure difference for "driving" the tapped cooling medium flow through the seal or past the seal can be achieved when the cooling medium flow is not supplied to the remaining cooling medium circuit directly behind the hydrodynamic machine, but is supplied to the cooling medium circuit directly before the cooling medium pump. The driving pressure difference then corresponds to the largest pressure difference occurring in the cooling medium circuit which occurs through the cooling medium pump.

According to a second solution in accordance with the invention, the cooling medium is branched off from the cooling medium circuit before or after the hydrodynamic machine, especially directly before or after the hydrodynamic machine, and it is resupplied to the remaining cooling medium circuit directly before or in the region of the cooling medium pump as soon as it has passed through the seal or has been conducted past the seal. As a result, a flow is obtained from the cooling medium circuit in the region of the hydrodynamic machine by the seal in the direction of the cooling medium pump, which differs from the first solution in accordance with the invention. It could thus be said that the direction of flow has been reversed by the seal.

When reference is made herein that the cooling medium is resupplied or branched off before or behind the hydrodynamic machine, then this shall be understood to be both a branching or supplying directly in the hydrodynamic machine or adjacent to the same, as well as in the cooling medium circuit in the region of the hydrodynamic machine. In the region of the hydrodynamic machine this usually means that with the exception of a valve and/or the branching or opening of a bypass no further components are provided which are cooled by the cooling medium or work with the cooling medium between the hydrodynamic machine and the branch-off or the recirculation.

Instead of the hydrodynamic machine per se, the branch-off point or recirculation point can also relate to the working space of the hydrodynamic machine. As a result, the branch-off and the recirculation can also be connected within the hydrodynamic machine.

According to the present invention, the cooling medium can be branched off or recirculated either in the cooling medium pump or directly behind or in front of the cooling medium pump. The branch-off point or the recirculation point can also be provided with such a distance relative to the cooling medium pump that the pressure at the branch-off point or recirculation point is substantially unchanged in relation to the pressure directly behind or before the cooling medium pump. This means that the cooling medium branch-off can be positioned in the drive motor to be cooled, e.g. within the terms of a short conduction within conduits for the branched-off cooling medium, but before a substantial pressure loss has occurred in the cooling medium by the arrangement of the lines by the drive motor. Depending on the pressure loss in the cooling medium circuit via the drive motor, the branch-off point can be positioned more closely or more remote from the cooling medium inlet into the drive motor. A branch-off only at the outlet of the cooling medium from the drive motor or in the cooling medium circuit behind the drive motor is usually avoided.

The measure in accordance with the invention leads to the consequence that the pressure difference between the cooling medium branch-off and the cooling medium recirculation is increased as compared with the state of the art. This applies especially to such cooling systems in which the cooling medium in the cooling medium circuit is not supplied by the pump directly to the hydrodynamic machine such as a retarder, a coupling or a converter, but is conducted at first through a further component to be cooled such as the drive motor and/or a transmission connected to the drive motor. The pressure drop between the branch-off point and the recirculation is thus additionally increased. The driving pressure difference for the cooling/lubricating medium flow via the seal is respectively large.

The seal in the hydrodynamic machine to be cooled or lubricated can be a shaft seal, especially an axial face seal. The axial face seal is arranged for example as a double-acting seal with a sealing liquid or generally with a sealing medium. The sealing liquid or sealing medium is the volume flow branched off from the cooling medium circuit which is introduced into the seal. The double action is that the sealing chamber with the sealing liquid is sealed in both oppositely directed axial directions.

When the hydrodynamic machine is arranged as a retarder, then a retarder arranged in the cooling circuit, especially the vehicle cooling circuit, is designated as a water retarder. The water is used both as a working medium as well as a cooling medium for the seal, especially as a sealing liquid for the double-acting axial face seal.

The invention is now explained in closer detail by way of examples by reference to embodiments, wherein.

Figure 1:
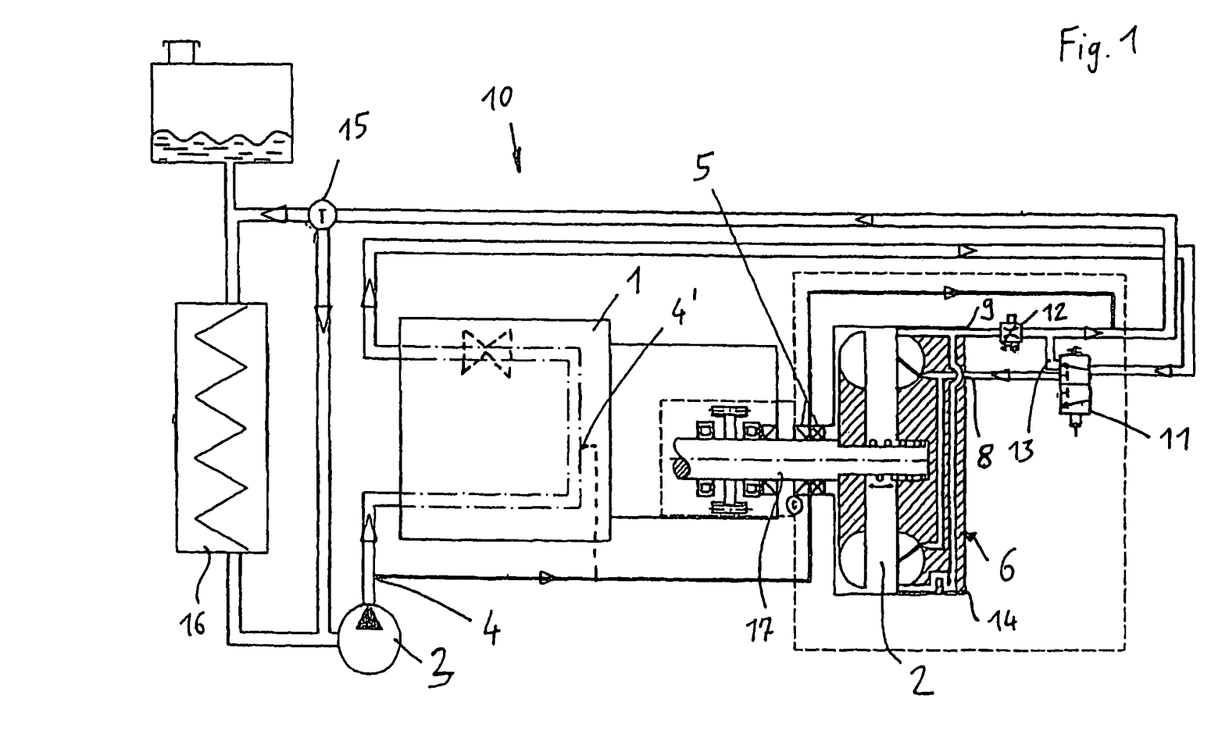
FIG. 1 shows a first embodiment in accordance with the invention, in which the branched cooling medium flow is introduced into the cooling medium circuit again behind the retarder.

FIG. 1 shows the cooling medium circuit 10 in which a cooling medium, which is usually water or a water/glycol mixture, is revolved by means of a cooling medium pump 3. The guidance of the cooling medium pump in the cooling medium circuit 10 is as follows: The cooling medium pump 3 pumps the cooling medium into the drive motor 1, so that the cooling medium absorbs heat from the drive motor 1. The cooling medium flows from the drive motor 1 to a switching valve 11. The switching valve 11 is used to conduct the cooling medium flow in a first switching direction in the direction of retarder 6 and in a second switching position through bypass 13 past the retarder. The bypass can also be provided within the retarder. The relevant aspect is that the cooling medium (as the working medium) is guided past the working space 2 of the retarder.

As illustrated, the switching valve is a 3/2-port directional control valve which is triggered especially in a pneumatic manner.

When the switching valve 11 is in its first switching position, which means that the retarder 6 is activated, the cooling medium flows in the cooling medium circuit 10 into the working space 2 via a working medium inlet 8 in housing 14 of retarder 6. Notice must be taken that the drawings show the deactivated state of the retarder 6, in which the working medium or cooling medium is conducted through the bypass 13 past the retarder 6, and the two blade wheels of the retarder (rotor and stator) are moved away from another in the axial direction.

The cooling medium or working medium flows from the working space 2 through a working medium outlet 9 to a control valve 12, by means of which the pressure in the working chamber 2 is adjusted in braking operation, and from the control valve 12, behind which the bypass 13 opens in the direction of flow which originates in or behind the switching valve 11, to a thermostatic valve 15. Depending on the cooling medium temperature, the thermostatic valve 15 switches the cooling medium circuit to the air/water heat exchanger 16 (also known as cooler) and/or past the same. Finally, the cooling medium flows back to the cooling medium pump 3.

A cooling medium branch-off 4 is provided in the direction of flow of the cooling medium directly behind the cooling medium pump 3 or also at the output of the cooling medium pump 3 in order to use a portion of the cooling medium for cooling the shaft seal, by means of which the retarder input shaft 17 is sealed against the retarder housing 14, which shaft can be arranged in an integral way with a transmission output shaft. The portion of the cooling medium which is branched off at the cooling medium branch-off 4 is usually very small in relationship to the cooling medium share that continues to flow in the working medium circuit 10 and is only a fraction of the same.

The branched cooling medium is conducted from the cooling medium branch-off 4 directly into the shaft seal 5 which is arranged as an axial face seal, or through the same. For this purpose, an additional inlet is provided on the retarder 6 or in the retarder housing 14 next to the working medium inlet 8.

From the shaft seal 5, the cooling medium which is branched off for cooling and/or lubricating the shaft seal 5 from the cooling medium circuit 10 is conducted back to the cooling medium circuit 10 and into the same. An additional outlet is provided for this purpose on the retarder 6 or in the retarder housing 14 in addition to the working medium outlet 9.

In accordance with FIG. 1, the recirculation occurs in the direction of flow of the cooling medium (working medium) behind the retarder 6, which in this case occurs behind the orifice of bypass 13.

FIG. 1 simultaneously shows an alternative cooling medium branch-off 4' which is positioned within the drive motor 1. In this case, the conduction of the flow within the drive motor 1 (as is indicated by the throttle symbol) has a larger pressure drop only in the comparatively rear area, whereas the pressure drop in the front region (relating to the section of the cooling medium circuit within the drive motor 1) is relatively small. The cooling medium branch-off 4' is therefore provided before the rear area in the cooling medium circulation, with the consequence that the pressure difference between the outlet of the cooling medium pump 3 and the cooling medium branch-off 4' is sufficiently small.

Figure 2:
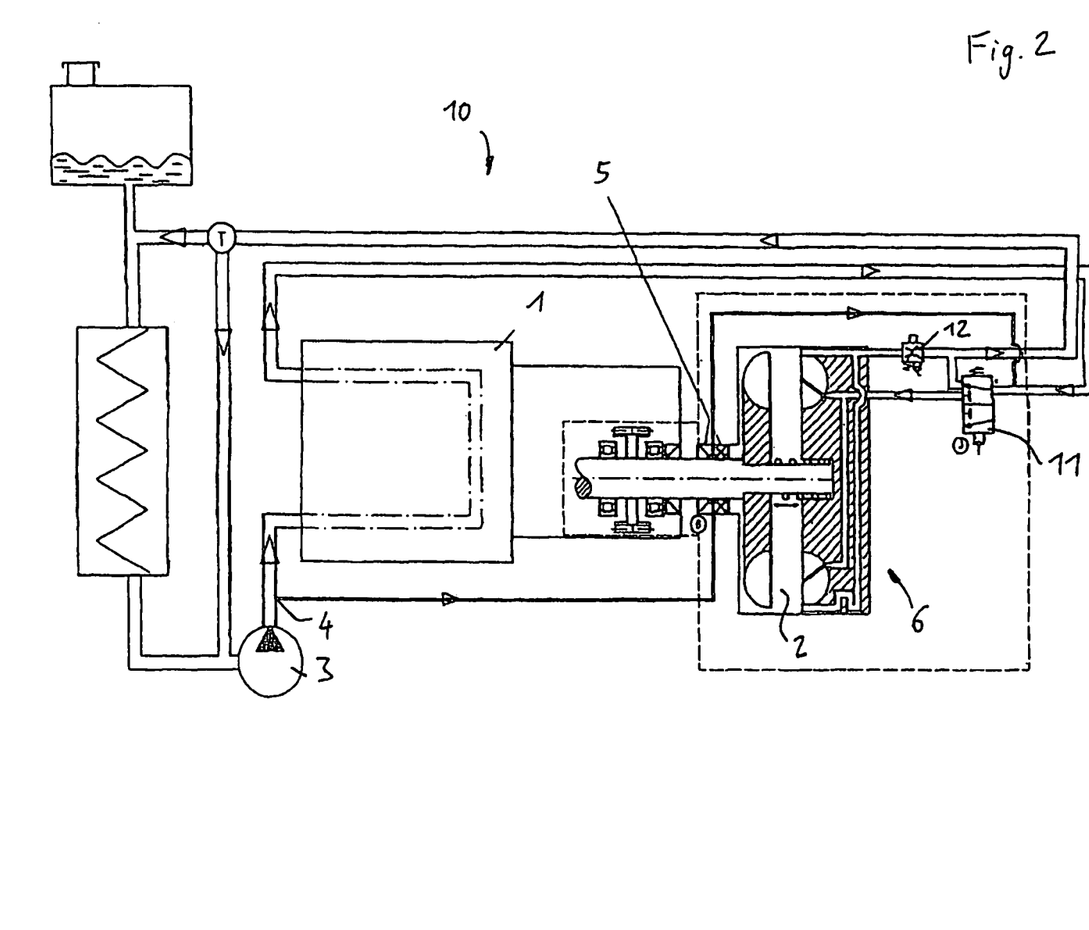
FIG. 2 shows an embodiment according to FIG. 1, but with recirculation of the branched cooling medium flow into the cooling medium circuit before the retarder.

According to FIG. 2, the recirculation occurs before the retarder 6, which in this case is before the switching valve 11 in the direction of flow.

Based on the illustrated embodiment, there is always a pressure difference from the cooling medium branch-off 4 up to the recirculation to the cooling medium circuit 10, which pressure difference corresponds to the pressure drop in the cooling medium circuit 10 via the drive motor 1 (FIG. 2) or via the drive motor 1 and the retarder 6.

Figure 3:
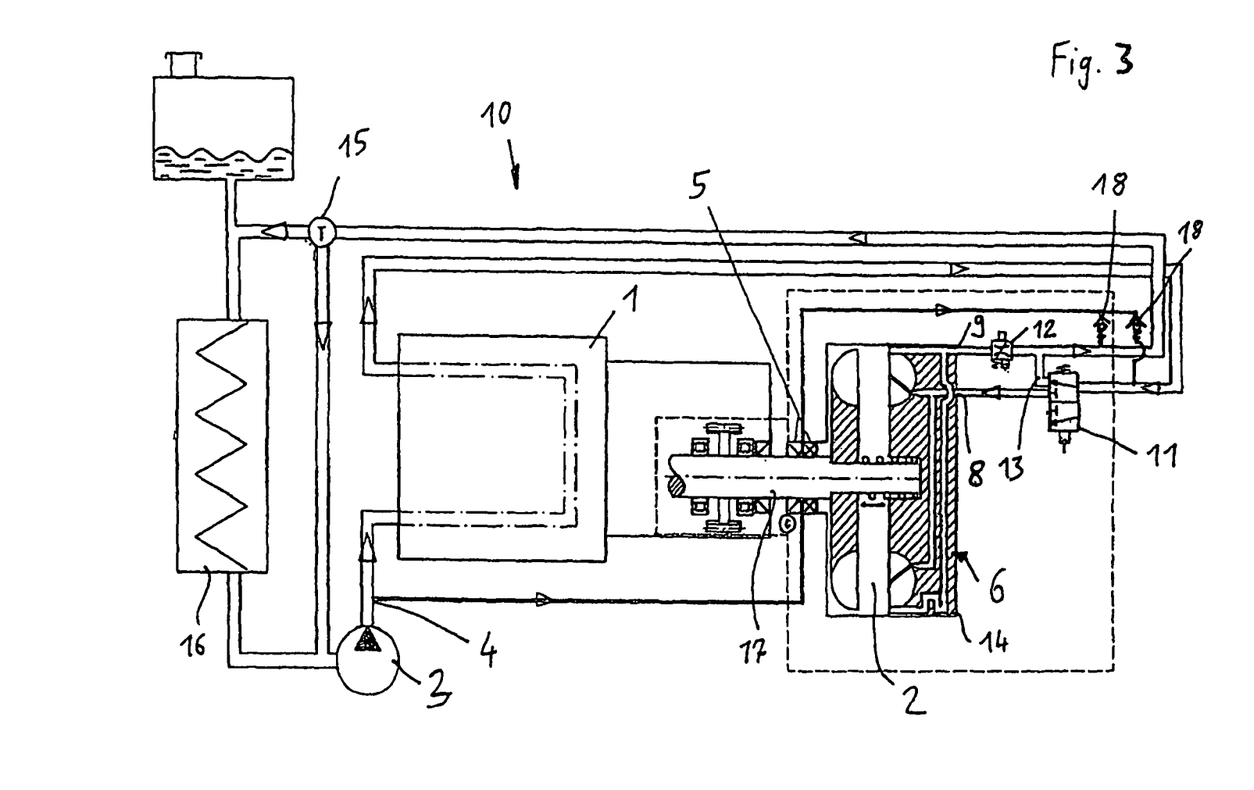
FIG. 3 shows a third embodiment which combines the embodiments according to FIGS. 1 and 2 and positions the recirculation of the branched cooling medium flow automatically at the point of the relatively lowest pressure before or after the retarder.

According to FIG. 3, a connection is provided for the cooling medium guided through the seal or past the seal, especially the shaft seal 5, both before the retarder 6 as well as behind the retarder 6. A non-return valve 18 is provided in both connections or before both of the same. Accordingly, the non-return valve 18 will open behind which the pressure is applied which is comparatively lower in the direction of flow. In braking operation, this will be the non-return valve 18 in the line which opens before the retarder 6. In non-braking operation, this will be the non-return valve 18 in the line which opens behind the retarder. The cooling medium used for cooling the shaft seal 5 therefore automatically "seeks" the best path with respect to the driving pressure.

Concerning the precise connection of the two recirculations with one non-return valve 18 each, reference is hereby made to the embodiments described in FIGS. 1 and 2.

Figure 4:
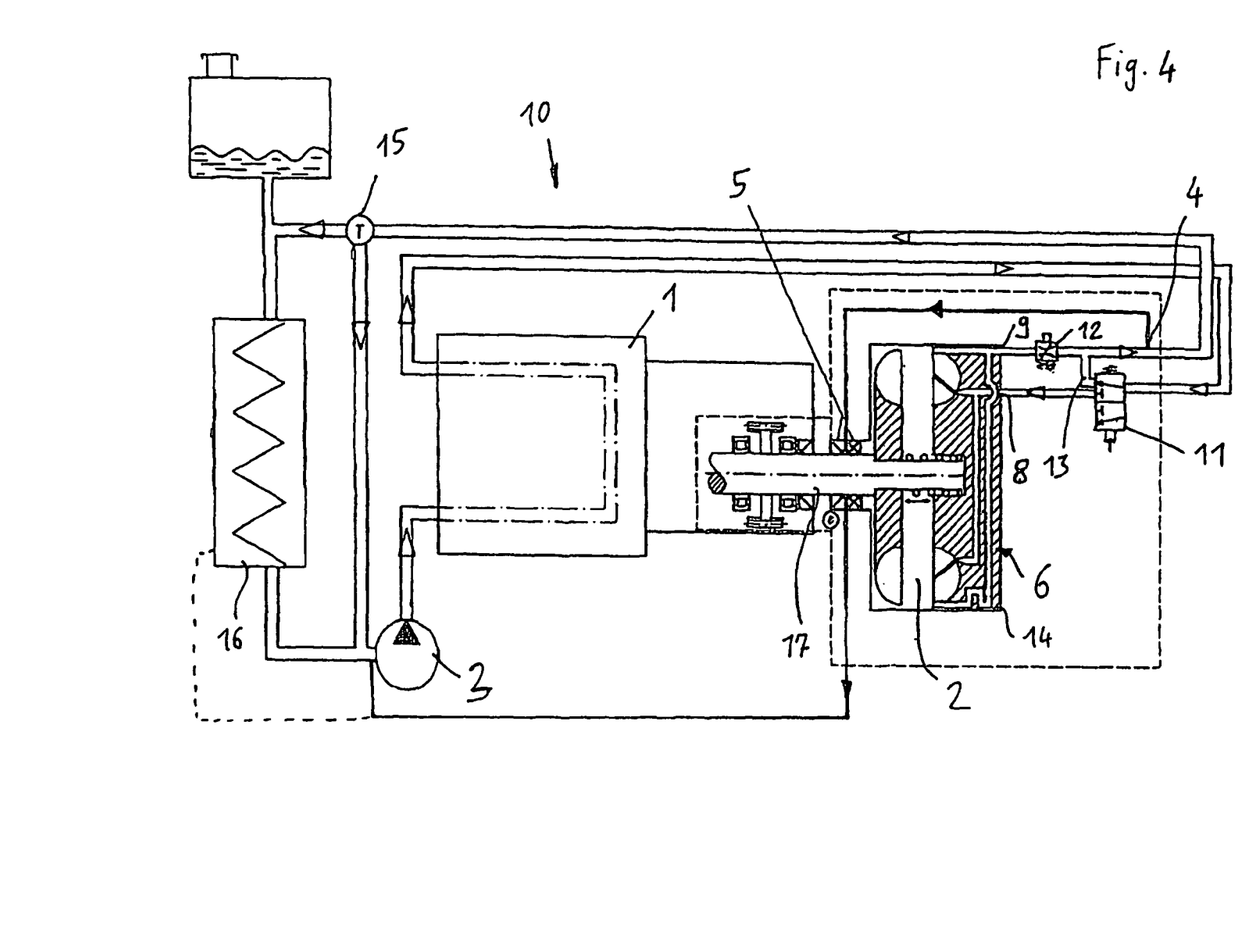
FIG. 4 shows an embodiment according to the second solution in accordance with the invention, in which a cooling medium flow which is branched off behind a retarder is introduced back into the cooling medium circuit before the cooling medium pump.
Figure 5:
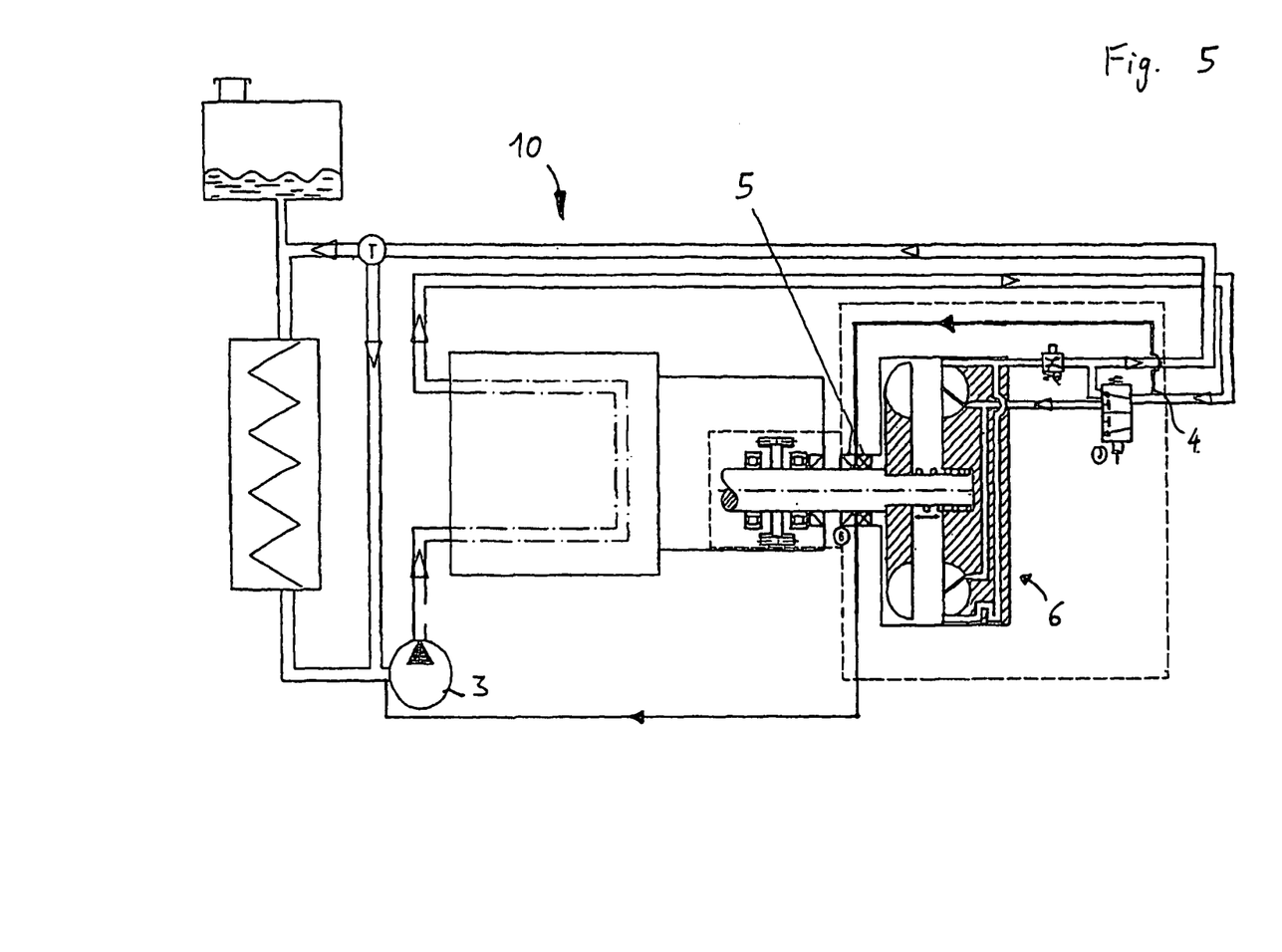
FIG. 5 shows an embodiment according to FIG. 4, but with a branch-off of the cooling medium flow before the retarder.

FIGS. 4 and 5 show the second solution of the present invention. Respective components are again shown with the respective reference numerals. In this case, the cooling medium for cooling the shaft seal (5) (generally a seal) is branched off either behind the retarder 6 (FIG. 4) or before the retarder 6 (FIG. 5) in the direction of the flow of the cooling medium circuit (see the cooling medium branch-off 4) and resupplied to the cooling medium circuit 10 in the direction of flow directly before the cooling medium pump 3.

Instead of a recirculation directly before the cooling medium pump 3, it is also possible to provide a recirculation in the region of the cooling medium circuit 10 before the cooling medium pump 3. This is illustrated again by a broken line, with the recirculation occurring within the heat exchanger 16 in the embodiment shown with the broken line. The precise positioning of the recirculation occurs advantageously depending on the pressure level, with the pressure level of the entrance of the cooling medium into the cooling medium pump 3 being maintained approximately, and within the terms of an advantageous routing of the lines relating to the length of the lines.

A relatively large pressure difference as a driving force for the cooling medium flow can thus be achieved even in the case of a "reversed" guidance of the flow of the cooling medium used for cooling the shaft seal 5 (in comparison with FIGS. 1 to 3).

Figure 6:
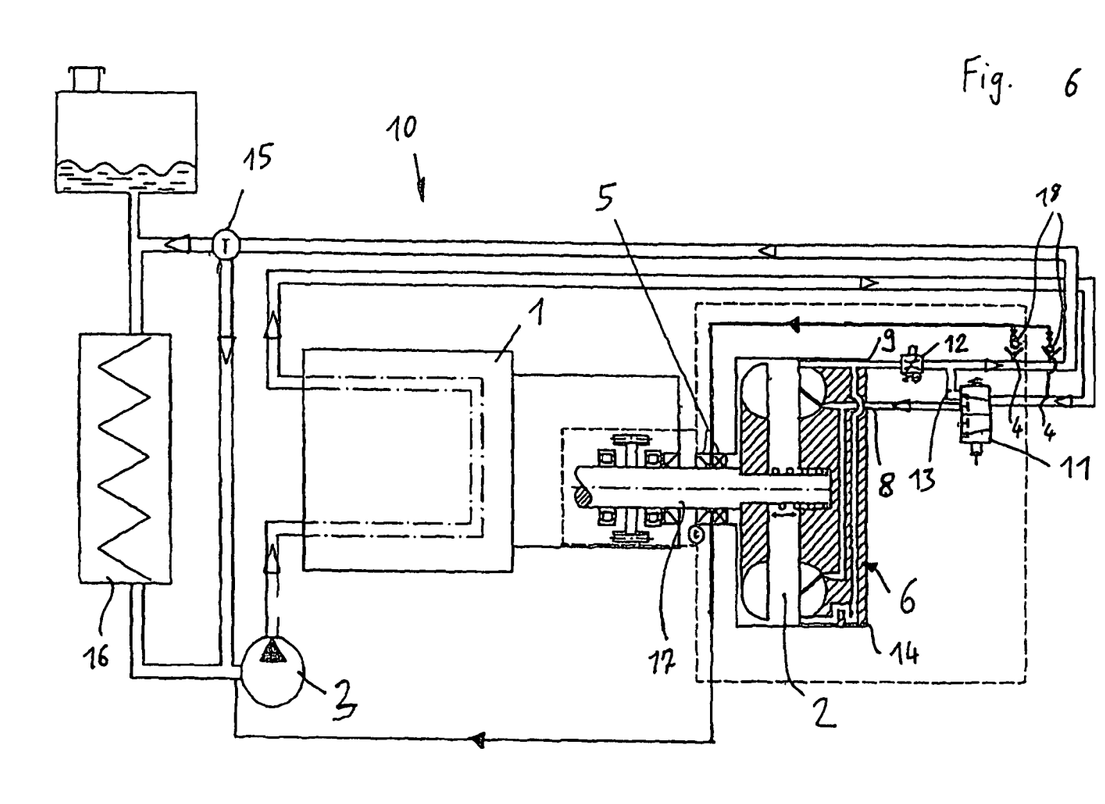
FIG. 6 shows an embodiment which utilizes both possibilities according to the FIGS. 4 and 5 and branches off the cooling medium flow automatically at the point of higher pressure before or after the retarder.

According to FIG. 6, two cooling medium branch-offs 4 are provided, which are a first cooling medium branch-off 4 in the direction of flow of the cooling medium circuit 10 before the hydrodynamic retarder 6 and one behind the hydrodynamic retarder 6. As in the embodiment according to FIG. 3, two non-return valves 18 are provided, a non-return valve 18 each in one of the two parallel lines which open into their respective cooling medium branch-off 4 or originate from the same. However, the direction of opening of the two non-return valves 18 is reversed in relation to the embodiment according to FIG. 3. In this case, the non-return valve 18 will open which has the higher pressure with respect to the connection before or behind the retarder 6 at the connection point. In non-braking operation, the non-return valve 18 will be opened in the line which is connected before the retarder 6. In braking operation, the non-return valve 18 in the line will open which is connected behind the retarder 6.

The recirculation of the cooling medium conducted through the shaft seal 5 occurs again in the direction of flow in the cooling medium circuit 10 directly before the cooling medium pump 3.

Figure 7:
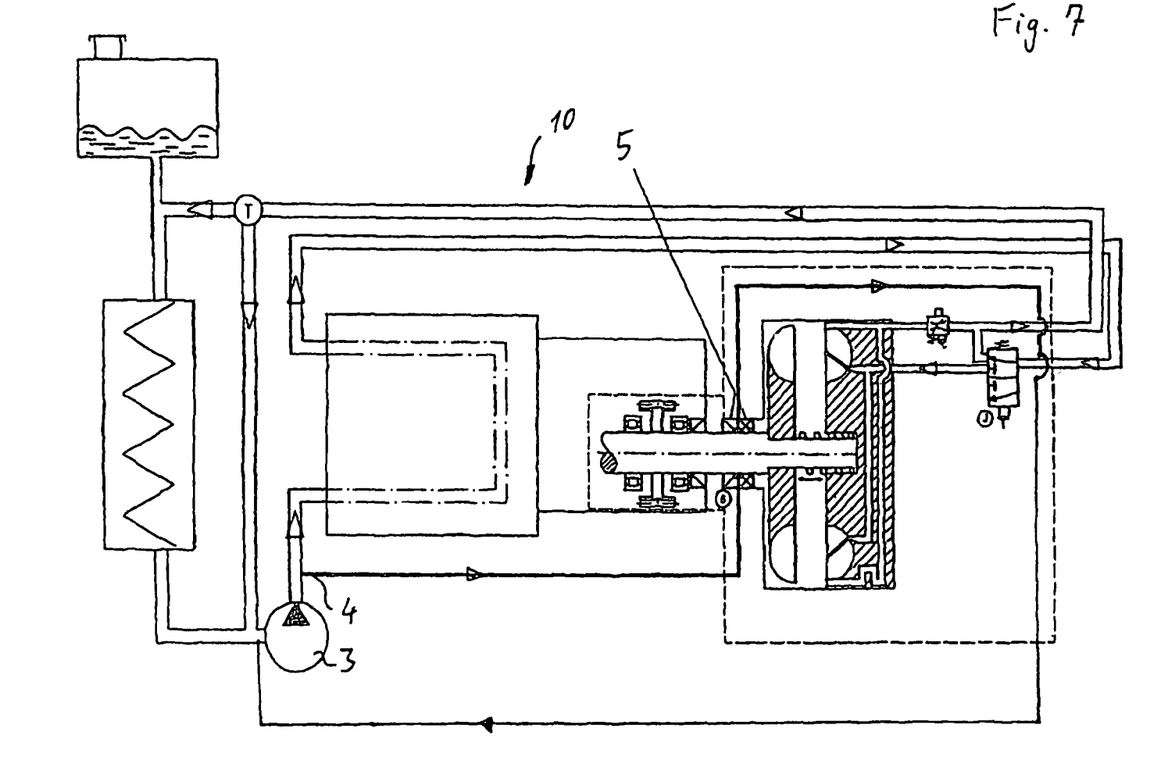
FIG. 7 shows a further embodiment in accordance with the invention, in which the maximum pressure difference in the cooling medium circuit is utilized for flowing through the seal to be cooled or for flowing around the seal to be cooled.

FIG. 7 shows an embodiment in which the maximum pressure difference in the cooling medium circuit 10 is used for driving the cooling medium flow through the shaft seal 5 or past the same. In this case, the cooling medium branch-off 4 is provided in the direction of flow in the cooling medium circuit 10 directly behind the cooling medium pump 3. Recirculation occurs directly before the cooling medium pump 3. The driving pressure difference for the cooling medium flow through the shaft seal 5 therefore corresponds to the pressure difference via the cooling medium pump 3.

Although the invention was explained in the drawings on the basis of a water retarder, it can also be implemented with another cooling medium such as oil or in other hydrodynamic machines.

The invention claimed is:
1. A cooling system, comprising:
   a drive motor to be cooled by a cooling medium;
   a cooling medium circuit guiding the cooling medium;
   a hydrodynamic machine comprising a working space that can be filled with a working medium, the working medium being the cooling medium, the hydrodynamic machine having a seal which is cooled and/or lubricated by the cooling medium;
   a cooling medium pump for revolving the cooling medium in the cooling medium circuit; and
   a cooling medium branch-off in the cooling medium circuit before or behind the working space through which cooling medium is branched off from the cooling medium circuit, the branched-off cooling medium being guided directly through or past the seal in order to cool and/or lubricate the seal, the cooling medium guided through or past the seal being resupplied to the cooling medium circuit in the direction of flow through a return line in the cooling medium circuit directly before the cooling medium pump.

2. A cooling system according to claim 1, wherein the seal is a shaft seal.

3. A cooling system according to claim 1, wherein the hydrodynamic machine is a hydrodynamic retarder.

4. A cooling system according to claim 1, wherein the hydrodynamic machine comprises a housing with a working medium inlet for feeding working medium to the working space and a working medium outlet for discharging working medium from the working space, and wherein the cooling medium which is guided through or past the seal is branched off from the cooling medium circuit in the direction of flow before the working medium inlet or behind the working medium outlet.

5. A cooling system according to claim 4, further comprising a switching valve for activating/deactivating the hydrodynamic machine being on the working medium inlet or before the working medium inlet in the direction of flow, and wherein the cooling medium which is guided through or past the seal is branched off before the switching valve to the cooling medium circuit in the direction of flow.

6. A cooling system according to claim 1, further comprising a bypass for guiding cooling medium past the hydrodynamic machine, and wherein the cooling medium which is guided through or past the seal is branched off from the cooling medium circuit, before, in or behind the bypass.

* * * * *